(Model.)

3 Sheets—Sheet 1.

J. R. POLLOCK.
SULKY PLOW.

No. 259,715.

Patented June 20, 1882.

WITNESSES
Jas. E. Hutchinson.
Herman Moran.

INVENTOR
J. R. Pollock.
B. H. A. Simpson
Attorney (Model.)

J. R. POLLOCK.
SULKY PLOW.

No. 259,715.

3 Sheets—Sheet 2.

Patented June 20, 1882.

(Model.) 3 Sheets—Sheet 3.
J. R. POLLOCK.
SULKY PLOW.

No. 259,715. Patented June 20, 1882.

WITNESSES
Jas. E. Hutchinson.
Herman Moran

INVENTOR
J R Pollock,
By H A Symons
Attorney

UNITED STATES PATENT OFFICE.

JAMES R. POLLOCK, OF MANSFIELD, OHIO.

SULKY-PLOW.

SPECIFICATION forming part of Letters Patent No. 259,715, dated June 20, 1882.

Application filed March 25 1882. (Model.)

*To all whom it may concern:*

Be it known that I, JAMES R. POLLOCK, of Mansfield, in the county of Richland and State of Ohio, have invented certain new and useful Improvements in Sulky-Plows; and I do hereby declare the following to be a full, clear, and exact description of the invention, such as will enable others skilled in the art to which it pertains to make and use the same.

My invention relates to sulky-plows, the object being to provide a plow of such construction that the depth or suction of the plow may be perfectly regulated, a direct forward and downward draft obtained from the plow-beam, and the operation of the plow facilitated and improved.

The invention consists in the combination, with a plow-beam, of the devices hereinafter described, whereby either or both ends of the beam may be raised or lowered.

The invention further consists in the combination, with the plow frame and beam, of a swinging bail and downwardly-inclined draft-rods, whereby both a forward and downward draft upon the plow is secured.

The invention further consists in the combination, with the plow, of a flanged land-wheel arranged at a distance from the plow equal to the width of one furrow, whereby to cut the sod and prepare the ground for the plow, as will be hereinafter fully described.

The invention further consists in the details of construction and combinations of parts hereinafter set forth, and pointed out in the claims.

Figure 1:
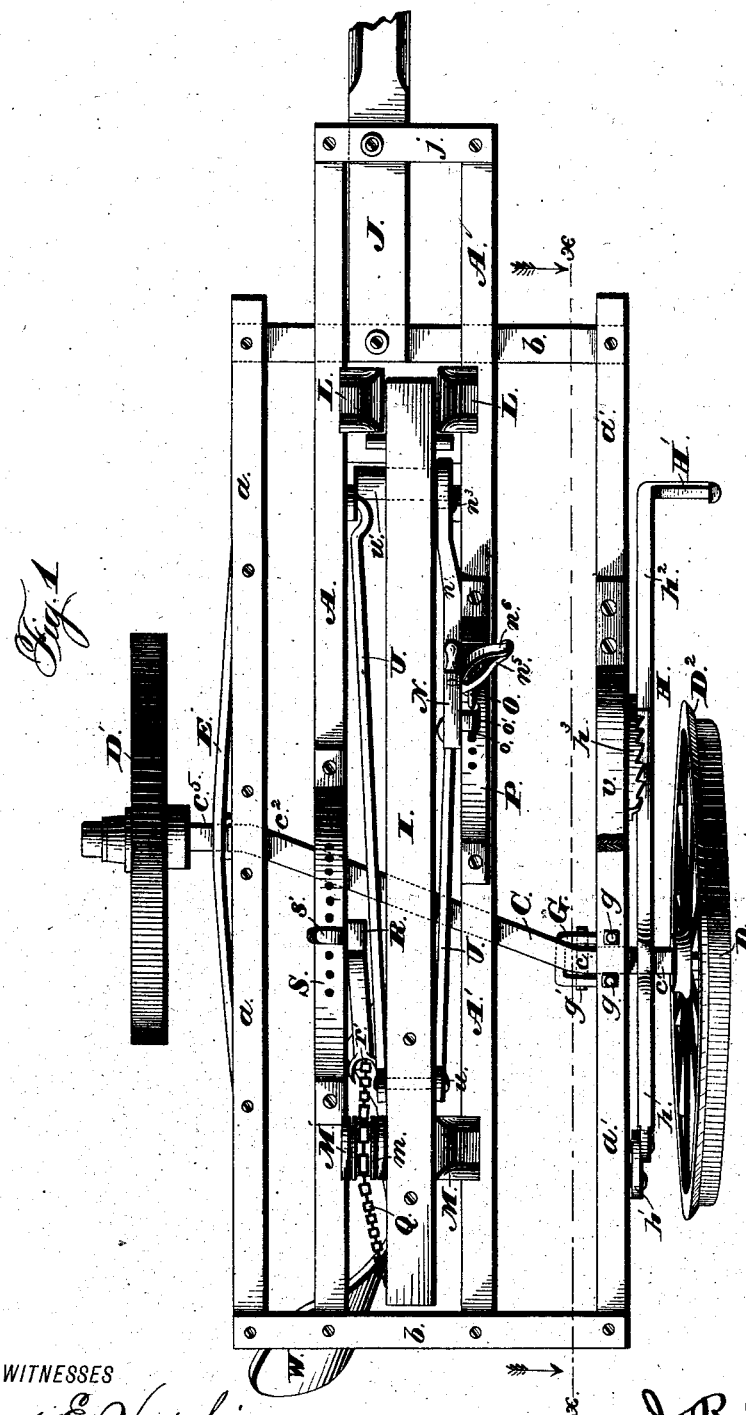
Figure 2:
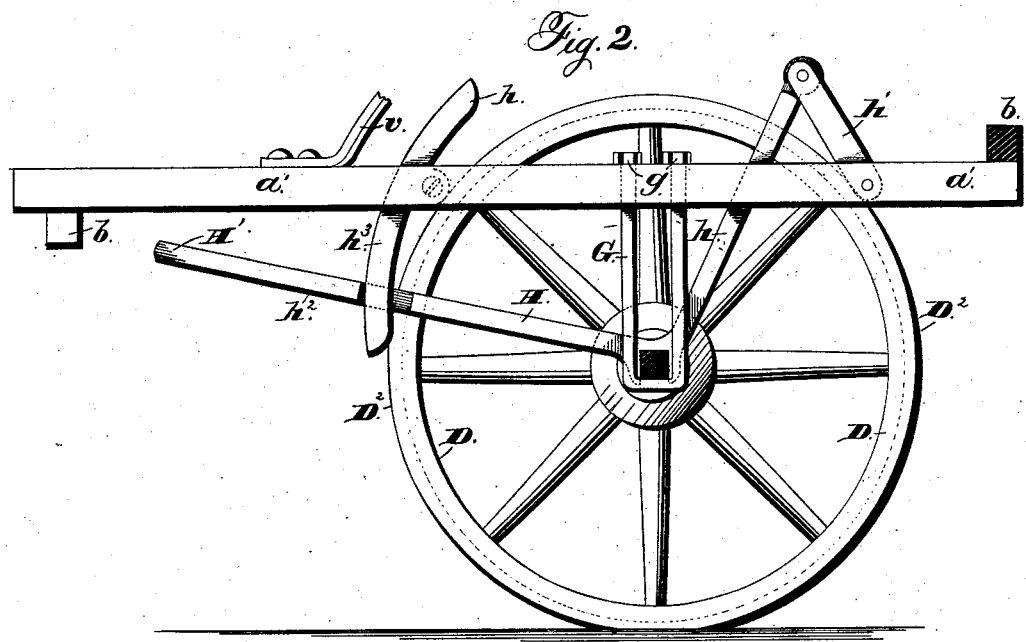
Figure 3:
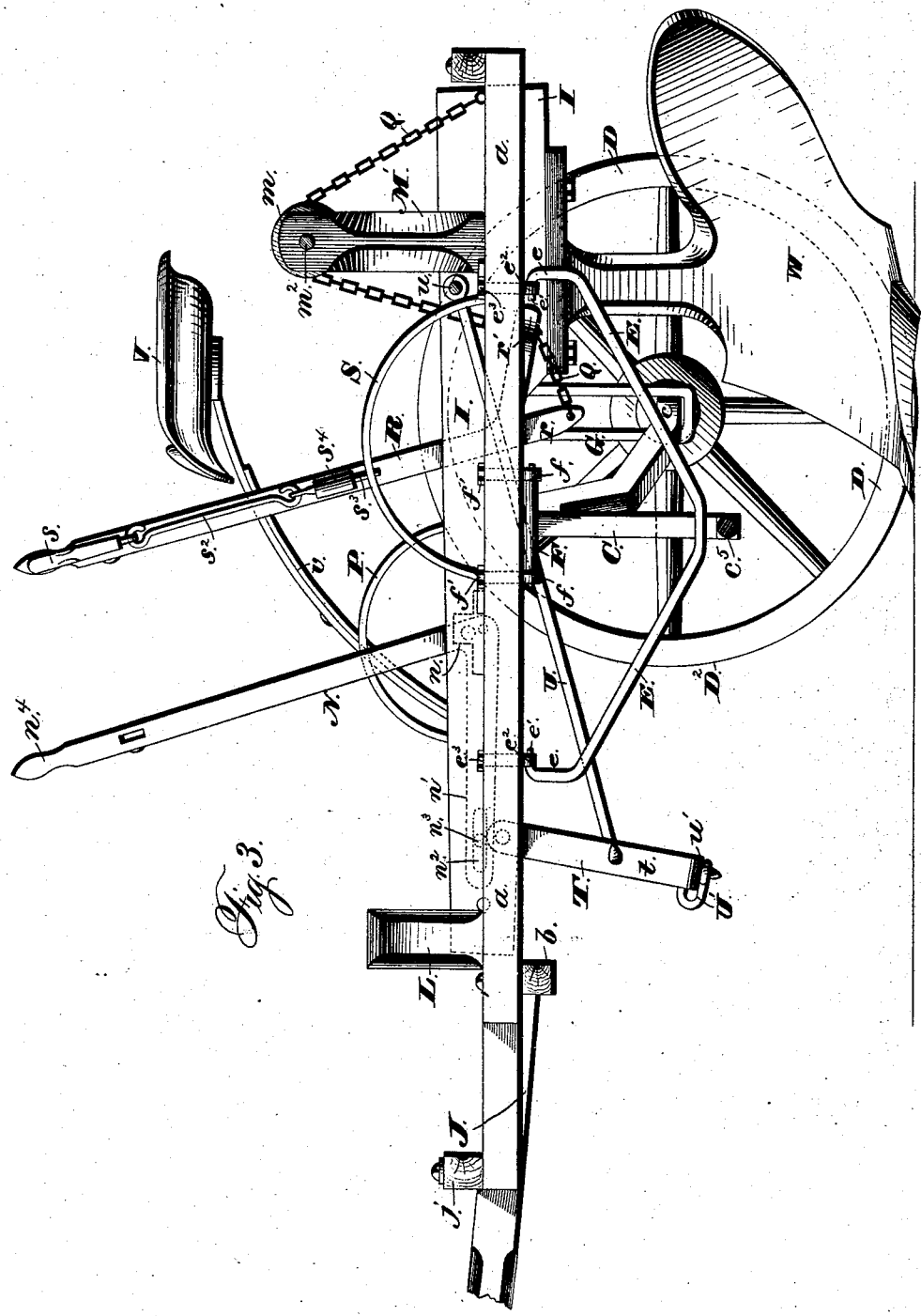

In the drawings, Figure 1 is a plan view of a plow constructed in accordance with my invention. Fig. 2 is a longitudinal section on the line $x\,x$ of Fig. 1. Fig. 3 is a side elevation taken from the mold-board side of the plow.

The frame of the plow consists of the side bars, $a\,a'$, and the end cross-bars, $b\,b$. Within the bars $a\,a'$ are arranged two parallel bars, A A'.

C represents the axle of the plow, having the main portion $c$ provided with a land-spindle, $c'$, upon which is mounted a land-wheel, D, having an annular flange, $D^2$. The opposite end, $c^2$, of the axle is bent upwardly and outwardly, and terminates in a depending arm, $c^5$, provided with an outwardly-projecting arm or spindle, upon which is mounted a wheel, D'. The furrow side of the axle C is secured to a bracket-support, E, the latter being secured at a central point to the lower end of the depending arm $c^5$ of the axle, while the ends $e\,e$ of said bracket are turned inwardly to form journals $e'\,e'$, which bear in eyebolts $e^2\,e^2$, projecting through the side bar $a$, and secured on the upper side of the latter by nuts $e^3\,e^3$.

The upper end of the depending arm $c^5$ of the axle is provided with a cross-bar, F, whose ends have pivotal bearing in eyebolts $f\,f$, projecting through the side bar $a$, and secured at the upper side of the latter by nuts $f'\,f'$. The opposite end of the axle C extends through a guide-loop, G, depending from the side bar $a'$ of the frame, the ends of said loop projecting through said side bar, and being held by nuts $g$ on the upper side thereof. A guide-pin, $g'$, is inserted through the axle adjacent to the loop G, to guide the latter.

H represents a lever of the bell-crank order, fulcrumed on the land-wheel side of the axle. The short arm $h$ of this lever is connected to the rear end of the frame by a link, $h'$, while the long arm $h^2$ extends forward to engage with the teeth of a sector, $h^3$, secured to the side bar $a'$, and terminates in a foot-piece or treadle, H', by means of which the frame of the plow may be adjusted, as will be further explained.

I represents the plow-beam, arranged between the parallel bars A A', which latter project beyond the front cross-bar, $b$, to receive between them a tongue, J, which is secured to the front bar, $b$, and to a cross-bar, $j$, that connects the forward ends of the bars A A'.

At the forward ends of the bars A A' are arranged two short standards or vertical guides, L L, secured rigidly one to each of said bars. At the rear ends of the bars A A' are rigidly secured vertical guides M M', the guide M' projecting above the guide M, and slotted at its upper end to receive a pulley, $m$, which is mounted therein on a pin, $m^2$.

The plow-beam I is guided between the guides L L and M M'. The forward end of the beam is supported by a bell-crank lever, N, fulcrumed on a bracket, $n$, on the bar A, the short arm $n'$ of said lever having an elongated slot, $n^2$, within which bears a laterally-projecting pin, $n^3$, of the beam. The long arm of the lever terminates in a handle, $n^4$, provided with a hand-lever, $n^5$, pivoted to said long arm of the lever N. The lever $n^5$ is of the bell-crank order, and is provided with a spring, $n^6$, interposed between the long arm of the lever $n^5$ and the handle of the lever N. To the short arm of the lever $n^5$ is connected a rod, O, which carries at its opposite end a dog, $o$, the latter being guided in a perforated lug, $o'$, of the lever N, and adapted to engage with a perforated arched bar or sector, P, secured to the arm A of the frame.

To the rear end of the beam I is secured a chain, Q, which passes forward over the pulley $m$ and between guiding jaws or arms $r'$ of the short arm of a bell-crank lever, R, to the downwardly-projecting arm $r$ of the lever, to which it is secured.

The lever R is fulcrumed on the inner side of the bar A'. The long arm of said lever is provided with a hand-lever, $s$, spring $s'$, connecting-rod $s^2$, dog $s^3$, and perforated lug $s^4$, said dog being adapted to engage with a sector, S, secured to the bar A'. The short arm of the lever R is provided with arms $r'$ to serve as a guide for the chain Q, which latter, as above stated, is secured at its inner end to the projecting arm $r$ of the lever R.

Near the forward end of the frame a swinging draft-bail, T, is secured to the bars A and A'. The sides $t$ of this bail are perforated to receive the forward ends of the inclined draft-rods U U, the rear ends of which embrace the beam I, to which they are pivotally secured by a bolt, $u$. A clevis, U', may be secured to the cross-bar $u'$ of the bail. A seat, V, is supported on the side bar $a'$ of the frame by a spring-support, $v$, in any suitable manner.

W represents the plow, secured to the rear end of the beam, and preferably made without a landside.

The plow as thus constructed is adapted to operate as follows: By pushing forward the front lever, N, the plow may be given the desired suction or depth. When an obstruction is met in plowing, the front end of the beam may be readily raised to ride over the obstruction by drawing back the lever N. By means of the rear lever, R, the rear end of the beam and plow may be adjusted to the desired position. The draft-rods impart both a forward and a downward pull to the plow. Thus the plow may be kept to a good working depth in hard ground without depending upon the weight of the sulky and frame for its downward pressure. This downward draft causes the plow to sink until it is checked by the chain Q. Thus the entire weight of the plow and the earth passing over the mold-board is borne by the wheels.

An important feature of my invention is the land-wheel D, with its flange $D^2$. Said wheel is located at a distance from the plow equal to the width of one furrow. By this arrangement the flange $D^2$ is caused to cut into the soil, and thus materially aids the plow in turning the furrow.

By means of the foot-lever H the frame of the plow may be adjusted to keep it level in plowing on hillsides.

When the draft devices above described are used the plow can be run level, not requiring the usual dip or suction at the point. Thus the plow-point will not become unduly worn, and the draft will be lighter.

Many slight changes in the details of construction of my improvement may be resorted to without departing from the spirit of my invention. Hence I do not limit myself to the exact construction shown and described, but reserve to myself the right to make all such changes of form and construction as may properly fall within the scope of my invention.

Having fully described my invention, what I claim as new, and desire to secure by Letters Patent, is—

1. In a sulky-plow, the combination, with the frame, of a plow-beam supported between vertical guides projecting above the frame, the forward end of said beam being connected to one arm of a bell-crank lever, while its rear end is secured to a chain which passes over a pulley mounted in one of said vertical guides, and is connected to a lifting-lever, substantially as set forth.

2. In a sulky-plow, the combination, with the plow-beam working in guides above the frame, of a swinging draft-bail depending from the forward end of the frame, and inclined draft-rods secured at their forward ends to said bail and at their rear ends to the plow-beam, substantially as set forth.

3. In a sulky-plow, the combination, with the plow-beam and frame-guides, of a swinging draft-bail depending from the forward end of the frame, and two or more draft-rods, having their forward ends secured on each side of said bail and their rear ends secured on either side of the plow-beam, substantially as set forth.

In testimony whereof I have signed this specification in the presence of two subscribing witnesses.

JAMES R. POLLOCK.

Witnesses:
A. J. ENDLY,
S. F. BELL.